(12) United States Patent
Cho

(10) Patent No.: US 7,292,879 B2
(45) Date of Patent: Nov. 6, 2007

(54) METHOD AND APPARATUS OF ALERTING A USER OF A MOBILE ELECTRONIC DEVICE

(75) Inventor: Han Cho, Wheaton, IL (US)

(73) Assignee: Matorola, Inc., Schaumburg, IL (US)

( * ) Notice: Subject to any disclaimer, the term of this patent is extended or adjusted under 35 U.S.C. 154(b) by 223 days.

(21) Appl. No.: 10/330,630

(22) Filed: Dec. 27, 2002

(65) Prior Publication Data
US 2004/0204150 A1    Oct. 14, 2004

(51) Int. Cl.
*H04Q 7/32* (2006.01)
(52) U.S. Cl. ............... 455/567; 455/575.3; 455/556.1; 455/557
(58) Field of Classification Search ............ 455/575.3, 455/567, 575.1, 575.2, 575.4, 575.6, 575.7, 455/575.8, 90.3, 556.1, 556.2, 557; 379/433.13
See application file for complete search history.

(56) References Cited

U.S. PATENT DOCUMENTS 5,923,751 A * 7/1999 Ohtsuka et al. ........ 379/433.13
6,304,170 B1 * 10/2001 Armstrong et al. ..... 455/567 X
2002/0177471 A1 * 11/2002 Kaaresoja et al. .......... 455/567
2003/0125081 A1 * 7/2003 Boesen ........................ 455/556

OTHER PUBLICATIONS

Samsung Products; The Mobile Gallery/Mobile Phone; from www.samsung.com/Products/MobilePhone/themobilegalleryl; Apr. 1, 2003; p. 1.
Samsung Products; The Mobile Gallery/Mobile Phone/SPH-A5000-Automatic Folder; from www.samsung.com/Products/MobilePhone/themobilegallery/; Apr. 1, 2003; p. 1.

* cited by examiner

*Primary Examiner*—Philip J. Sobutka
(74) *Attorney, Agent, or Firm*—Vadder, Price, Kaufman & Kammholz, P.C.

(57) ABSTRACT

A method and apparatus for receiving a user alert signal (110), and generating an external vibrator control signal (114) in response to the user alert signal (110), and moving a first mobile electronic device structure member (102) relative to a second mobile electronic device structure member (104) in response to the external vibrator control signal (114).

19 Claims, 3 Drawing Sheets

METHOD AND APPARATUS OF ALERTING A USER OF A MOBILE ELECTRONIC DEVICE

FIELD OF THE INVENTION

The invention relates generally to alerting users of mobile electronic devices in response to the occurrence of a user alert event, and more particularly, to methods and apparatus for providing vibration alerts for mobile electronic device users.

BACKGROUND OF THE INVENTION

Mobile electronic devices currently exist, including, but not limited to cell phones, personal data assistants, and two-way pagers, to name a few, which provide a wide variety of ways of notifying or alerting users to the occurrence of particular events such as incoming telephone calls and time related reminders. Such user alert functionality can be generally categorized as audible, visual or tactile. For example, cell phones and pagers may be set to a ringer or vibration mode (or both) to alert a user to an incoming call or the occurrence of a time event such as an appointment reminder It is not uncommon to find user alert functionality in cell phones, or other mobile electronic devices, that include multiple tone and melody selections. In more recent developments, cell phone providers have introduced even greater number of audible alerts by providing downloadable audible alerts from the Internet.

Absent from this growing diversity in alert tones are those in the tactile area. To date, tactile user alerting has been generally limited to standard vibration techniques that involve the vibrating of an entire mobile electronic device in relation to its surroundings by the use of an internal vibration mechanism. This internal vibrating mechanism has been typically achieved through the spinning of an overbalanced motor mechanism contained within the body of the phone.

Although not used in conjunction with user alerts, some mobile wireless devices of a clam shell design, e.g., two-piece phones that have separate ear and mouth pieces and are unfolded for use, and utilize a motor to open and close the two clam shell pieces upon the press of an open and close button. The motor used to open and close such devices is known to be located in a pivot mechanism connecting the two pieces of the phone. In such devices a user physically presses a button to activate the opening or closing process. Typical operation of such motorized clam shell phones include the following: the user, by pressing a button, instructs the phone to transition from a closed position to an open position, and in response to this user input, the phone then engages the motor, and in one continuous movement the clam shell phone opens up. If the phone is initially open, the pressing of the button causes the phone to close in one continuous movement. In addition, if the user physically presses the button while the device is either in the process of opening or closing, the device will switch the process and begin closing or opening respectively. As such, a two way motor is driven in opposite directions upon the pressing of the button by the user. Further, such devices are also known to utilize a biased spring element to provide a force to assist in the opening and closing of the clam shell phone based upon the angle between the two pieces of the phone. This mechanical movement is to provide for the standard manual opening and closing of the clam shell phone in addition to the motorized opening and closing. However, such devices still use conventional user alert techniques such as rings and internal vibrators to notify a user of an incoming call or that an appointment time is approaching.

BRIEF DESCRIPTION OF THE DRAWINGS

The invention will be more readily understood with reference to the following drawings wherein like reference numerals represent like elements and wherein.

DETAILED DESCRIPTION OF THE PREFERRED EMBODIMENT

Figure 1:
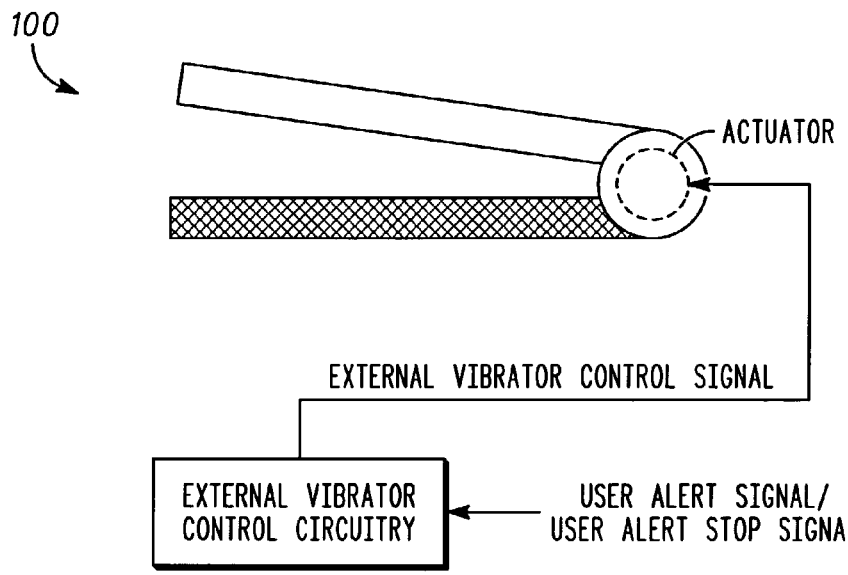
FIG. 1 is a block diagram illustrating one example of a system in accordance with one embodiment of the invention that alerts users of mobile electronic devices by moving a first mobile electronic device structure member relative to a second mobile electronic device structure member in response to the occurrence of a user alert event.

Briefly, a method and apparatus for controlling the movement (e.g., vibrate) between two distinct mobile wireless device structure members (e.g., two flip phone components) in such a manner as to signal a user of the occurrence of a user alert event such as a phone call or notification of an appointment time. More specifically, the mobile electronic device receives a user alert signal and generates an external vibrator control signal in response. An actuator connected to a first mobile electronic device structure member moves the first mobile electronic device structure member relative to the second mobile electronic device structure member in response to the external vibrator control signal.

Mobile electronic devices are known to include such devices as cell phones, handheld PDAs, and two-way pagers, to name only a few. Such mobile devices are known to generate user alert signals for the purpose of notifying users of such events as an incoming phone calls, the occurrence of time events such as the notification of an upcoming appointment, as well as alert mode change confirmation. An alert mode change confirmation is when a alert signal generated in response to a change in the alert mode, for example when a user changes his current notification mode from ringer to internal vibrate, the phone then sets off an alert mode and invokes a vibrate notification to the user so the user knows that the change in alert mode was successfully changed to internal vibration mode.

Actuators, generally known as a mechanical device for moving or controlling something, and as used herein, are generally known to include motors, springs, gears, cams or other suitable items that alone or together function as a lifting or moving mechanism. Mobile electronic device structure members generally include those external components of the mobile electronic device that define the outside of the device, and which generally enclose much of the internal electronics of such devices. Examples of mobile electronic structure members include a first and second enclosure, a base and a cover, or a mouthpiece and an earpiece as generally found in clam shell-like phones or flip phones. Clam shell phones are typically characterized by phones having a separate ear piece and mouth piece which collapse upon one another when the device is not in use. Such phones also typically contain mobile phone circuitry and components distributed on or within the two mobile electronic device structure members corresponding to the ear of mouth piece. However, such circuitry and components may be located within any one of the two mobile electronic device structure members in their entirety, as well as being distributed throughout. An example is where a first mobile electronic device structure member includes an earpiece and its related electronic circuitry as well as a display and its related electronics and a second mobile electronic device structure member includes a keypad, microphone and related circuitry, as well as a transceiver and other typical cell phone components known to be used in a mobile wireless communications device. Further, such mobile electronic device structure members are also known to simply be plastic covers without any circuitry or components contained therein. An example being a simple cover or flap to prevent accidental pressing of buttons on the face of the phone.

As used in this document, the term circuitry includes at least one of the following: one or more processing devices executing software, such as microprocessors, digital signal processors (DSPS), microcontrols or discrete logic, state machines or any suitable combination of hardware, software and/or firmware.

In the preferred embodiment, the first and second mobile electronic device structure members are pivotally connected about a hinge which contains the actuator. In one embodiment, the actuator is a two-way motor and is responsive to the receiving of a user alert signal to move the first mobile electronic device structure member in relation to the second mobile electronic structure member in a cyclical movement such that the two mobile device structure members begin in a position where they are parallel, then, in response to receiving a user alert signal, the actuator moves the first mobile electronic device structure member away from the second mobile electronic device structure member to a position of about 2° to 10° from the original parallel position. Then, once achieving this position, the actuator reverses direction such that the first mobile electronic device structure member now approaches the second mobile electronic device structure member in a closing fashion until the two mobile device structure members return to their parallel position. In another embodiment, similar structural member movement occurs with an actuator containing an electronic motor that operates in only one direction. Here, one or more components such as cams, gears or other suitable actuator components, as known by those with ordinary skilled in the art, are used in such a manner as to translate the forward motion of the electronic motor into both an up and down motion of the first mobile electronic device structure member relative to the second electronic device structure member.

Yet, in a preferred embodiment, the actuator includes both an electronic motor and a spring. Here again, the same movement of the first and second mobile electronic device structure members move as described above in the other two embodiments. Here, however, the spring provides the force to return the two mobile electronic device structure members to their parallel position. The motor here is unidirectional and turns in ultimate response of receiving a user alert signal. Upon reaching the desired opening angle as described in the other embodiments, the electric motor disengages, or otherwise allows the force of the spring to take over, to return the first mobile electronic device structure member to a position essentially the same as before being acted upon by the motor, e.g., where the first and second mobile electronic device structure member are essentially parallel. Here again, such other components such as cams, gears or other translational components can be used to achieve this movement.

In another embodiment, also including this cyclical movement between the two mobile electronic device structure members, the first mobile electronic device structure members are allowed to contact one another and to produce an audible sound. Yet, in another embodiment, such contact also occurs but such contact occurs at bumpers located on the second mobile electronic device structure member, where such bumpers are made out of an elastic or otherwise collision absorbent-type material suitable to produce a low audible sound, essentially resulting in an embodiment generally operates as a silent vibration mechanism.

FIG. 1 illustrates a mobile electronic device 100 such as cellular telephone, two-way pagers, PDA and other mobile electronic devices that generally include the properties that make them suitable for handheld operation or are otherwise easily transportable on one's person. As shown, mobile electronic device 100 includes a first mobile electronic device structure member 102, a second mobile electronics device structure member 104 and actuator 106. Further, the first mobile electronic device 100 also includes external vibrator control circuitry 108. Also associated with mobile electronic device 100 are the user alert signal 110, user alert stop signal 112 and the external vibrator control signal 114.

In operation, and in response to a user alert event, such as an incoming phone call, the occurrence of a time-based event, or the occurrence of a change of mode confirmation, or other suitable user alert circumstance, a user alert signal 110 is then generated and received by external vibrator control signal 108. The external vibrator control circuitry 108 then generates an external vibrator control signal 114 to control the movement of actuator 106, and in turn, control the movement of the first mobile electronic device structure member 102 with respect to the second mobile electronic device structure member 104. When initially closed (not shown), both the first and second mobile electronic device structure members 102-104 rest substantially parallel to one another. The actuator 106 in response to the external vibrator control signal 114 then proceeds to move the first mobile electronic device structure member 102 away from second mobile electronic device structure member 104 until such first and second mobile electronic device structure members 102-104 are separated by angle 116. Angle 116, where the purpose of movement is to generally transform the first and second mobile electronic device structure members 102-104 to an external vibrator, can generally range, for this purpose, from one degrees to fifteen degrees, but in the preferred embodiment is expected to be in the two degree to ten degree range. It should be noted that other embodiments forgo the vibrate aspect used by other embodiments and in contrast may move the two mobile electronic device structure components in some other form with respect to one another. However, in this embodiment, including vibrating type movement, operates such that upon reaching the desired angle 116 the mobile electronic device 100 then reverses its opening direction and the first mobile electronic device structure member 102 then begins to rotate towards the second mobile electronic device structure member 104 until the mobile electronic device 100 is in its essentially originally closed state where the first mobile electronic device structure member 102 substantially parallel to the second mobile electronic device structure member 104. This single movement from a closed position to a position of opening of the desired angle 116, and the subsequent return of the mobile electronic device 100 to its closed position with the first and second mobile electronic device structure members 102-104 in a substantially parallel position, represents a single cycle of the movement of the mobile electronic device 100 in response to the external vibrator control signal 114 as used in the preferred embodiment. The external vibrator control circuitry 108 provides movement to actuator 106 through external vibrator control signal 114 that will generally cycle the mobile electronic device 100 at least one time, however, it is preferred that multiple cycles occur in response to any one user alert stop signal 112. That is, it is contemplated that such multiple cycling will result in a more effective vibration mechanism for detection by the user.

User alert stop signal 112 provides functionality to mobile electronic device 100 such that after an initial user alert signal 110 has started a process of moving the first mobile electronic device structure member 102 in relation to the second mobile electronic device structure member 104, such movement may then be halted by sending this alert stop signal 112 to external vibrator control circuitry 108, which in manipulates the external vibrator control signal 114 to signal the actuator 106 to stop moving. Here, it is preferable to include, in the external vibrator control circuitry 108, logic that would generally provide that in response to a user alert stop signal 112 that the mobile electronic device 100 would stop in a position such that the device would come to rest in its closed position with the first mobile electronic device structure member 102 substantially parallel with the second mobile electronic device structure member 104. More specifically, in operation, the user alerts stop signal 112 reaches external vibrator control circuitry 108 which in turn terminates the external vibrator control signal 114 such that actuator 106 halts its movement of the first mobile electronic device structure member 102 in it with respect to the second mobile electronic device structure member 104 when angle 116 is essentially 0°, e.g., when the two mobile electronic device structure members are substantially parallel.

As shown in FIG. 1, the components generally considered to represent the components and circuitry of the external vibrator 101 includes all of the components shown in FIG. 1, in particular, the first and second mobile electronic device structure members 102-104, actuator 106, the external vibrator control circuitry 108, the user alert signal 110, the user alert stop signal 112 and the external vibrator control signal 114. All of these components make up the external vibrator 101 as they all work together to notify a user using an external vibration in response to the detection of a user alert signal 110.

Figure 2:
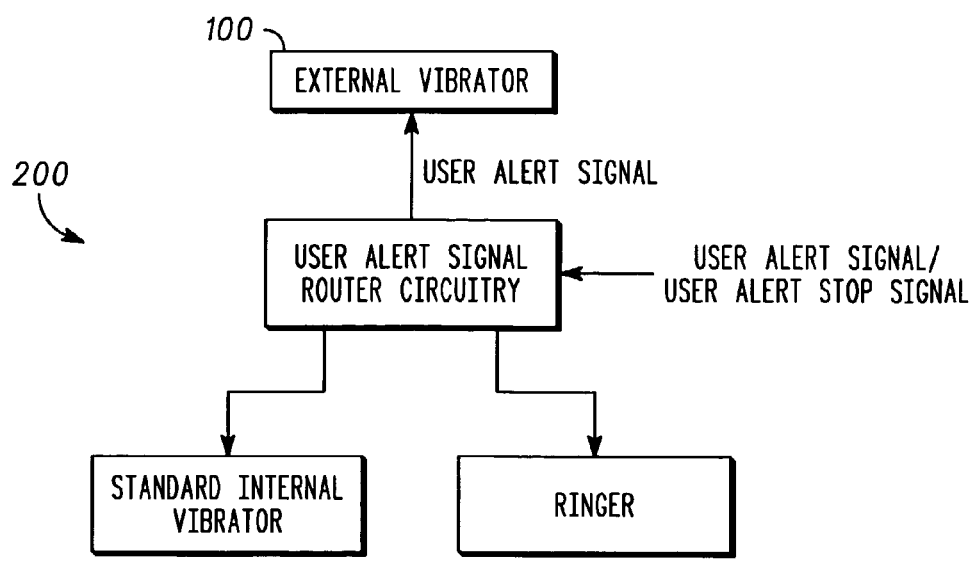
FIG. 2 is a higher level is a block diagram illustrating one example of a system in accordance with one embodiment of the invention that alerts users of mobile electronic devices by moving a first mobile electronic device structure member relative to a second mobile electronic device structure member in response to the occurrence of a user alert event.

Next, FIG. 2 illustrates additional mobile electronic device 200 circuitry and components such that the placement and operation of the external vibrator 101 can be better understood in relation to the other illustrated circuits and components. FIG. 2 shows components from FIG. 1 including external vibrator 101, user alert signal 110 and user alert stop signal 112. Further, FIG. 2 shows user alert signal router circuitry 202, standard internal vibrator 204 and ringer 206. Together, these components and circuitry 200 are all concerned with the processing of user alert signals through components that provide the contact with the user which notifies the user of the associated alert event. In operation, user alert signal 110 arrives at user alert signal router circuitry 202 where it is determined what type of user alert notification, if any, should take place. For example, should the user be notified via ringer 206 of the corresponding alert event or, should the standard internal vibrator 204 be used to notify the user, or alternatively should external vibrator 101 be used. As shown, user alert signal 110 arrives at user alert signal router circuitry 202 and is then directed by user alert signal router circuitry 202 to external vibrator 101. Depending on user preferences, for example, the user alert signal router circuitry 202 component may alternatively direct the user alert signal to the standard internal vibrator 204 or ringer 206.

Figure 3:
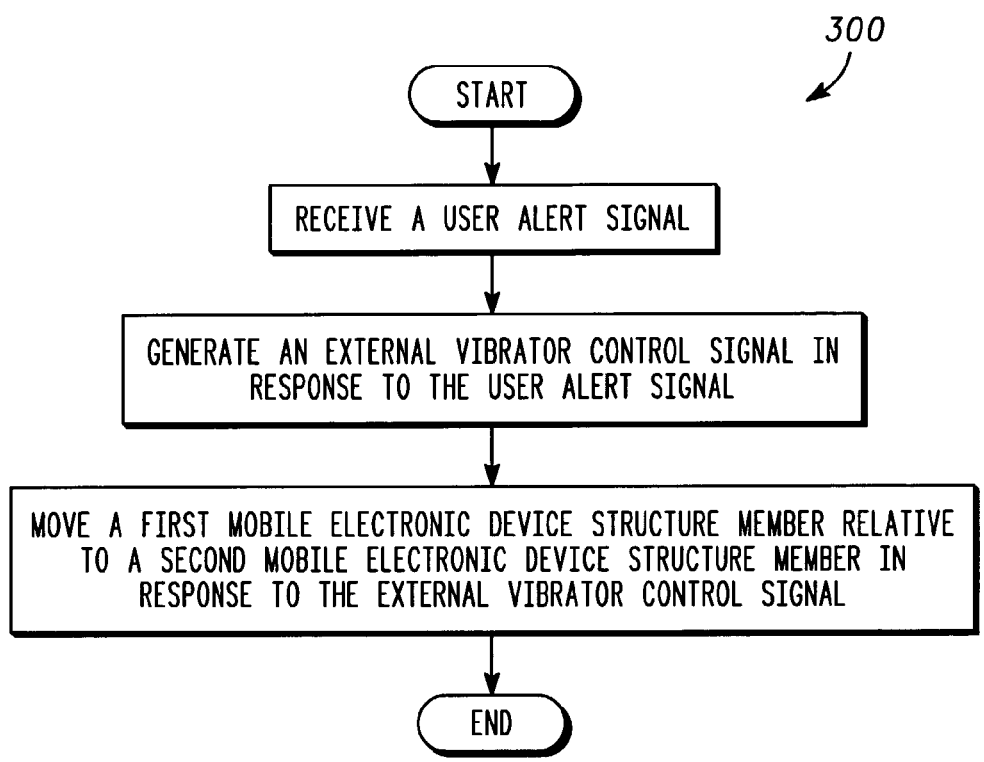
FIG. 3 is a method for alerting users of mobile electronic devices by moving a first mobile electronic device structure member relative to a second mobile electronic device structure member in response to the occurrence of a user alert event.

FIG. 3 illustrates a method 300 of alerting a user of a mobile electronic device that includes, as shown, receiving a user alert signal in step 302, generating an external vibrator control signal in response to the user alert signal in step 304, and then moving a first mobile electronic device structure member relative to a second mobile electronic device structure member in response to the external vibrator control signal in step 306. In one embodiment, the movement described in step 306 is more specifically, the moving of the first mobile electronic device structure member at least one movement cycle relative to the second mobile electronic device structure member. In another embodiment, this one movement cycle includes the contacting of the second mobile electronic device structure member with the first mobile electronic device structure member at least one time. In yet another embodiment, the movement described in step 306 further includes moving the first mobile electronic device structure member to a series of movement cycles relative to the second mobile electronic device structure member. Another embodiment includes this series of movement cycles to include a further contacting the second mobile security device structure member for a series of times. This repetitive or series of movement cycles is believed to be a preferred external vibrating technique.

Figure 4:
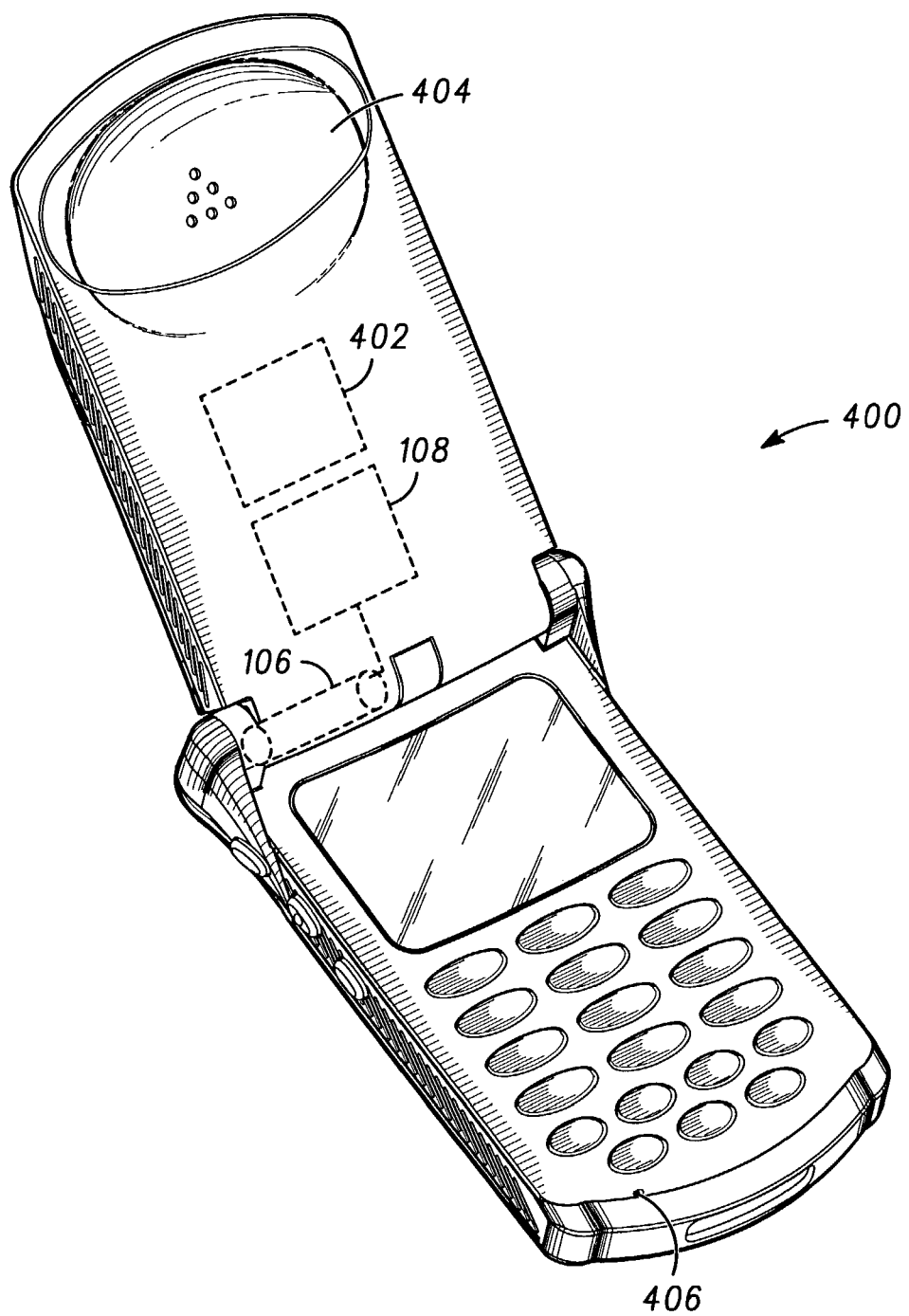
FIG. 4; is a diagram of a type of mobile electronic device illustrating one example of a system in accordance with one embodiment of the invention that alerts users of mobile electronic devices by moving a first mobile electronic device structure member relative to a second mobile electronic device structure member in response to the occurrence of a user alert event.

FIG. 4 illustrates a flip phone 400 of mobile electronic device 100. From FIG. 1, and in dashed lines, external vibrator control circuitry 108 is shown as well as actuator 106. In addition, transceiver 402 (in dashed lines) is shown as well as earpiece 404 and microphone 406. Beyond these components, other features specific to a flip phone such as keypad display, are also shown here but not described. All circuitry described herein, such as external vibrator control circuitry 108 and user alert signal router security 202 can be stored as computer code on a variety of computer readable mediums, such as floppy disks, hard disks, compact disks, optical storage media, or any other suitable storable means for digital information. And such computer readable codes stored on such mediums can be executed, causing one or more processors to perform the functionality inherent in such code, and as described above.

As used in this document, the term circuitry includes at least one of the following: one or more processing devices executing software, such as microprocessors, digital signal processors (DSPS), microcontrols or discrete logic, state machines or any suitable combination of hardware, software and/or firmware.

As illustrated, the above method and apparatus, among other things, provide for the alerting of a user of a mobile electronic device of an alert event using an external vibration mechanism. This can enhance a user's experience by providing user another means by which to be notified of user alert events. Further, the embodiments which include contacting the first mobile electronic device structure member 102 with the second mobile electronic device structure member 104 provide a new means to which to produce audible sounds in response to a user alert signal 110. In addition, for those embodiments already utilizing an actuator 106 to move a first mobile electronic device structure member 102 with respect to a second mobile electronic device structure member 104 a tactile vibration mechanism, here an external vibration mechanism, can be implemented without having to include another motor specifically directed to creating an internal vibration. Thus saving the costs associated the complexity and the weight associated with requiring an additional motor and its accompanying circuitry and components. Other advantages will be recognized by those of ordinary skill in the art. It should be understood that the implementation of other variations and modifications of the invention and its various aspects will be apparent to those of ordinary skill in the art, and that the invention is not limited by the specific embodiments described. It is therefore contemplated to cover by the present invention and all modifications, variation or equivalence that fall within the spirit and scope of the basic understanding principles disclosed in claims herein.

What is claimed is:

1. A mobile electronic device comprising:
external vibrator control circuitry for receiving a user alert signal, and for generating an external vibrator control signal;
an actuator, operatively coupled to the external vibrator control circuitry for receiving the external vibrator control signal, and operatively connected to a first mobile electronic device structure member to move the first mobile electronic device structure member relative to a second mobile electronic device structure member in response to the external vibrator control signal; and
an internal vibrator operatively coupled to selectively receive the user alert signal.

2. The mobile electronic device of claim 1 wherein the actuator, in response to the external vibrator control signal, moves the first mobile electronic device structure member through at least one movement cycle relative to the second mobile electronic device structure member.

3. The mobile electronic device of claim 2 wherein the at least one movement cycle includes contacting the second mobile electronic device structure member with the first mobile electronic device structure member at least one time.

4. The mobile electronic device of claim 2 wherein the actuator, in response to the external vibrator control signal, moves the first mobile electronic device structure member through a plurality of movement cycles relative to the second mobile electronic device structure member.

5. The mobile electronic device of claim 4 wherein the plurality of movement cycles include contacting the second mobile electronic device structure member with first mobile electronic device structure member a plurality of times.

6. The mobile electronic device of claim 1 wherein the external vibrator control circuitry ceases the generation of the external vibrator control signal in response to at least one of receiving a user alert stop signal and an expiration of a period of time after having received a user alert signal.

7. The mobile electronic device of claim 1 wherein the first mobile electronic device structure member is a cover.

8. The mobile electronic device of claim 1 wherein the second mobile electronic device structure member is a base.

9. A mobile electronic device comprising:
a wireless transceiver to transmit and receive wireless signals;
external vibrator control circuitry for receiving a user alert signal, and for generating an external vibrator control signal;
an actuator, operatively coupled to the external vibrator control circuitry for receiving the external vibrator control signal, and operatively connected to the first mobile electronic device structure member to move the first mobile electronic device structure member relative to the second mobile electronic device structure member in response to the external vibrator control signal;
wherein the first mobile electronic device structure member is a cover and the second mobile electronic device structure member is a base; and
an internal vibrator operatively coupled to selectively receive the user alert signal.

10. The mobile electronic device of claim 9 wherein the first mobile electronic device structure member is pivotally connected to the second mobile electronic device structure member.

11. The mobile electronic device of claim 9 having dimensions small enough to fit within a human hand.

12. The mobile electronic device of claim 9 wherein the mobile electronic device is a flip phone.

13. The mobile electronic device of claim 9 further comprising an earpiece located in the cover.

14. The mobile electronic device of claim 9 further comprising a microphone located in the base.

15. A method of alerting a user of a mobile electronic device comprising:
receiving a user alert signal;
generating an external vibrator control signal in response to the user alert signal;
moving a first mobile electronic device structure member relative to a second mobile electronic device structure member in response to the external vibrator control signal; and
generating an internal vibrator control signal in response to the user alert signal.

16. The method of claim 15 wherein the moving includes moving the first mobile electronic device structure member at least one movement cycle relative to the second mobile electronic device structure member.

17. The method of claim 16 wherein the at least one movement cycle includes contacting the second mobile electronic device structure member with the first mobile electronic device structure member at least one time.

18. The method of claim 15 wherein the moving includes moving the first mobile electronic device structure member though a plurality of movement cycles relative to the second mobile electronic device structure member.

19. The method of claim 18 wherein the plurality of movement cycles include contacting the second mobile electronic device structure member with the first mobile electronic device structure member a plurality of times.

* * * * *